United States Patent
Saito et al.

(10) Patent No.: US 8,663,063 B2
(45) Date of Patent: Mar. 4, 2014

(54) CONTROL APPARATUS FOR VEHICLE DRIVING SYSTEM

(71) Applicant: Denso Corporation, Kariya (JP)

(72) Inventors: Tomohiro Saito, Chiryu (JP); Hiroshi Okada, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/870,245

(22) Filed: Apr. 25, 2013

(65) Prior Publication Data
US 2013/0324360 A1 Dec. 5, 2013

(30) Foreign Application Priority Data
May 31, 2012 (JP) ................................. 2012-125422

(51) Int. Cl.
*B60W 10/02* (2006.01)
(52) U.S. Cl.
USPC ............................................................ 477/5
(58) Field of Classification Search
USPC ........... 477/5, 3, 98, 97, 34, 70, 72, 76; 475/5
See application file for complete search history.

(56) References Cited

U.S. PATENT DOCUMENTS

| | | | |
|---|---|---|---|
| 6,881,167 B2* | 4/2005 | Inada | 475/5 |
| 8,475,330 B2* | 7/2013 | Kaltenbach et al. | 477/5 |
| 2003/0036457 A1* | 2/2003 | Wu et al. | 477/98 |
| 2007/0275819 A1 | 11/2007 | Hirata | |
| 2009/0156355 A1* | 6/2009 | Oh et al. | 477/5 |

FOREIGN PATENT DOCUMENTS

JP 2009-137329 6/2009

* cited by examiner

*Primary Examiner* — David D Le
*Assistant Examiner* — David J Hlavka
(74) *Attorney, Agent, or Firm* — Nixon & Vanderhye PC

(57) ABSTRACT

A first slip travel mode is traveling or starting in a state where a first clutch is fully connected and a third clutch is fully disconnected while a second clutch is slipped. A second slip travel mode is traveling or starting in a state where the first clutch is fully connected and the second clutch is fully disconnected while the third clutch is slipped. An overheat avoidance mode is traveling or starting in a state where the first clutch is fully disconnected and the second clutch is fully connected while the third clutch is slipped. When the second clutch is in a high-temperature state under the first slip travel mode or the third clutch is in a high-temperature state under the second slip travel mode, the slip travel mode is switched into the overheat avoidance mode. This reduces a heat value of the second clutch or third clutch.

6 Claims, 8 Drawing Sheets

CONTROL APPARATUS FOR VEHICLE DRIVING SYSTEM

CROSS REFERENCE TO RELATED APPLICATION

The present application is based on Japanese Patent Application No. 2012-125422 filed on May 31, 2012, the disclosure of which is incorporated herein by reference.

TECHNICAL FIELD

The present disclosure relates to a control apparatus for a vehicle driving system including a power transmission apparatus to transmit an engine power and a motor generator power to an axle of a vehicle.

BACKGROUND ART

[Patent Literature 1] JP 2009-137329 A

A hybrid vehicle which has an engine and motor generator (MG) as a vehicular power source is noted recently from social needs of a low fuel consumption and low exhaust emission. Patent Literature 1 describes a hybrid vehicle in which disposes (i) a motor generator in a power transmission path, which transmits an engine power to a driving wheel, (ii) a first fastening element between the engine and motor generator, and (iii) a second fastening element and a third fastening element between the motor generator and the driving wheel.

An engine-used slip travel is a travel or start-up in a state where the first fastening element is completely fastened and the second and third fastening elements are slipped. In Patent Literature 1, when it is determined that the second or third fastening element is in an overheated state under the engine-used slip travel, a slip amount of one of the second and third fastening elements, whichever is overheated, is reduced while a slip amount of the other is increased. This helps prevent the decline of durability due to the overheating of the fastening element.

In the technology of Patent Literature 1, when the second fastening element or the third fastening element is determined to be in an overheated state, the first fastening element is maintained to be fastened to connect the engine and the motor generator. Thus, neither the second fastening element nor the third fastening element is fastened in a very low speed region providing a transmission gear ratio lower than an engine idling speed. This requires both the second fastening element and the third fastening element to slip. Therefore, overheating of the second fastening element or the third fastening element is not improved. In a worst case, the slip control of the second fastening element or the third fastening element becomes impossible; thereby, the travel only by the motor generator may be unavoidable. This may not achieve a requested driving force.

In addition, either the second fastening element or the third fastening element may be fastened completely. Such a case needs a slip control for a fastening element, which is slipped, with a margin in order to avoid the lock of the transmission gear ratio for fail-safe. This disables securement of the continuity in the requested driving force, possibly degrading drivability.

SUMMARY

It is an object of the present disclosure to provide a control apparatus of a vehicle driving system which realizes a requested driving force while avoiding overheating of a clutch.

To achieve the above object, an aspect of the present disclosure provides a control apparatus of a vehicle driving system as follows. The vehicle driving system includes a power transmission apparatus to transmit power of an engine and power of a motor generator to an axle. The power transmission apparatus includes: an engine input axis which transmits the power of the engine; a motor input axis which transmits the power of the motor generator; an output axis which outputs a power transmitted to the axle; an engine-side gear mechanism that transmits a power of the engine input axis to the output axis, without passing through the motor input axis; a motor-side gear mechanism that transmits a power of the motor input axis to the output axis, without passing through the engine input axis; a first clutch which connects and disconnects a power transmission between the engine input axis and the motor input axis; a second clutch which connects and disconnects a power transmission between the motor-side gear mechanism and the output axis; and a third clutch which connects and disconnects a power transmission between the engine-side gear mechanism and the output axis. The control apparatus comprises: a high-temperature determination section that determines whether at least one of the second clutch and the third clutch is in a high-temperature state being a state at a temperature higher than a high-temperature-side threshold value; and a clutch control section which switches a slip travel mode into an overheat avoidance mode when it is determined that the second clutch or the third clutch is in the high-temperature state under the slip travel mode. Herein, the slip travel mode is traveling or starting in a state where the first clutch is fully connected while either the second clutch or the third clutch is slipped, while the overheat avoidance mode is traveling or starting in a state where the first clutch is fully disconnected while the second clutch is fully connected.

Now, a slip travel mode is to travel or start in a state where a first clutch is fully connected (fully fastened, in a fully fastened state) while either a second clutch or a third clutch is slipped (in a slipped state). Suppose a case where it is determined that the second clutch or the third clutch is in a high-temperature state under the slip travel mode. In such a case, it is determined that if the high-temperature state further continues, the second clutch or the third clutch may become in an overheated state (a state of a higher temperature than a permissible upper limit temperature); thereby, the slip travel mode is switched into an overheat avoidance mode where a travel or start-up is made in a state where the first clutch is in a fully disconnected state (fully open state) while the second clutch is in a fully connected state. This reduces a heat value of the second clutch or the third clutch, avoiding beforehand the second clutch or third clutch from becoming in an overheated state.

This overheat avoidance mode is to fully disconnect the first clutch, permitting the engine power and the motor generator power to transmit independently to an output axis. Thus, the second clutch is fully connected without limitation due to the lower limit rotation speed (idling speed) of the engine while the requested driving force is realizable with the engine power and the motor generator power. In addition, although the second clutch is fully connected, the first clutch is fully disconnected. This eliminates a possibility that the engine and the motor generator are locked, making the clutch control easier and avoiding the degrading of driveability.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
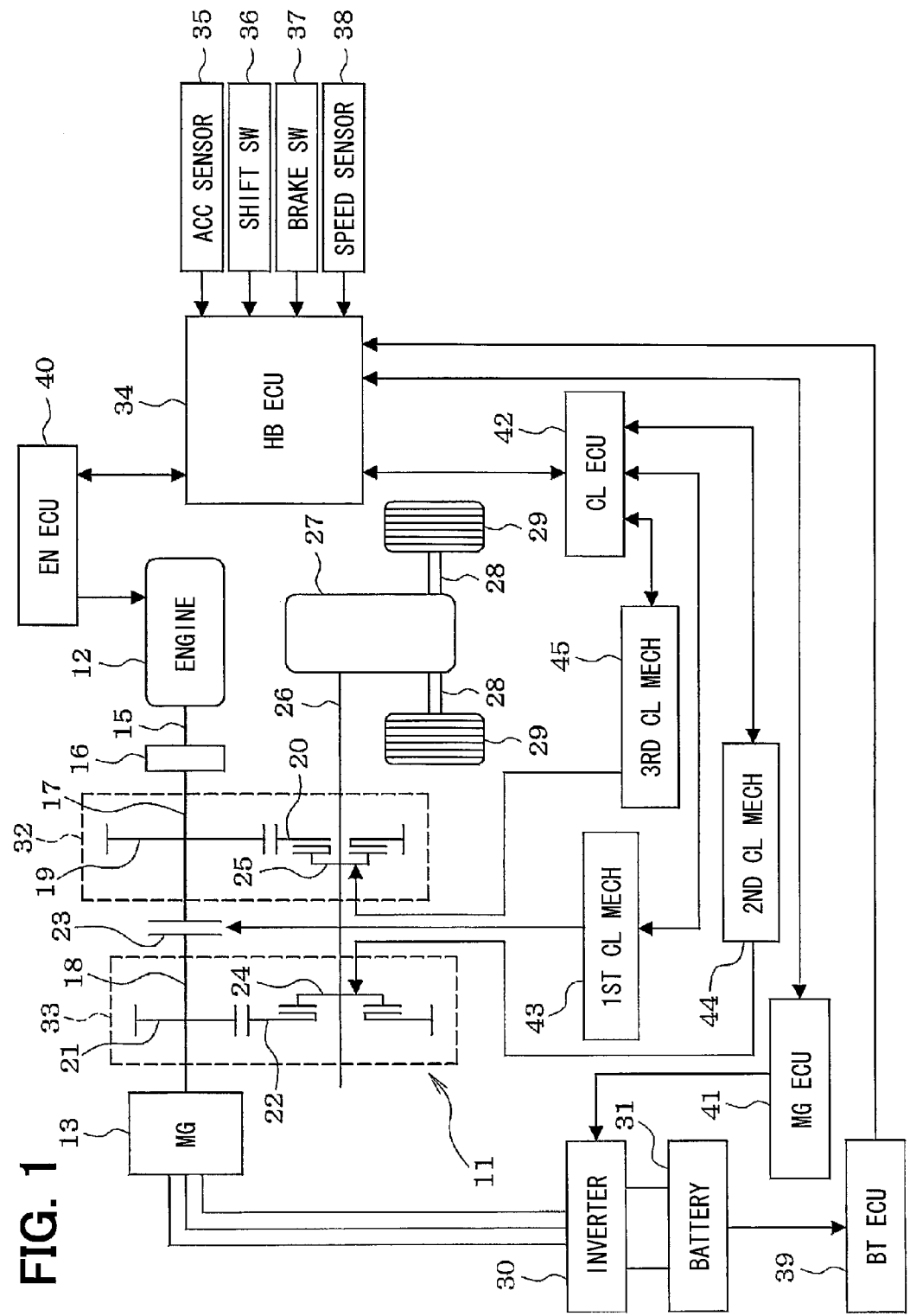
FIG. 1 is a diagram illustrating a schematic configuration of a driving system of a hybrid vehicle according to an embodiment of the present disclosure.

An embodiment according to the present disclosure will be explained below. FIG. 1 illustrates a vehicle driving system of a hybrid vehicle. A power transmission apparatus 11 mounted in the hybrid vehicle includes: an engine 12; a motor generator 13; a first engine input axis 15; a damper 16; a second engine input axis 17; a motor input axis 18; an engine-side drive gear 19 and an engine-side driven gear 20; a motor-side drive gear 21 and a motor-side driven gear 22; a first clutch 23; a second clutch 24; a third clutch 25; an output axis 26; and a differential gear 27. A driving torque or power generated by the engine 12 and/or motor generator 13 is transmitted to an axle 28; thereby, a driving wheel 29 is provided with a driving power.

The motor generator 13 is connected to a battery 31 (storage battery or secondary battery) via an inverter 30; the motor generator 13 transmits and receives electric power to and from the battery 31 via the inverter 30. The engine 12 is an internal-combustion engine. The motor generator 13 functions as (i) an electric motor which rotates on electric power from the battery 31, and (ii) a generator, which generates electricity using output torque transmitted from the power transmission apparatus 11 (specifically motor input axis 18) and charges the battery 31.

The first engine input axis 15 extended from the engine 12 receives the power generated by the engine 12. This first engine input axis 15 functions as an axis which transmits the power received from the engine 12. The first engine input axis 15 connects the engine 12 with a well-known torsional vibration damper 16. The damper 16 is connected, at the side opposite to the first engine input axis 15, with the second engine input axis 17, which is coaxial with the first engine input axis 15. Therefore, this second engine input axis 17 transmits the power of the first engine input axis 15 via the damper 16. The second engine input axis 17 is rotatably attached with the engine-side drive gear 19; the drive gear 19 rotates together with the second engine input axis 17.

The motor input axis 18 is extended from the motor generator 13 and receives power generated by the motor generator 13. This motor input axis 18 functions as an axis which transmits the power received from the motor generator 12. The motor input axis 18 is rotatably attached with the motor-side drive gear 21; the drive gear 21 rotates together with the motor input axis 18.

The second engine input axis 17 and the motor input axis 18 are parallel and coaxial. In addition, the first clutch 23 is provided between the second engine input axis 17 and the motor input axis 18 as a clutch mechanism, which coaxially connects and disconnects the second engine input axis 17 and the motor input axis 18 with each other. The first clutch 23 may be a wet-type clutch or dry-type clutch.

The output axis 26 is located in parallel with (i) the first engine input axis 15, (ii) the second engine input axis 17, and (iii) the motor input axis 18, and outputs the power that is transmitted to the differential gear 27 and axle 28.

The engine-side driven gear 20 is engaged with the drive gear 19, and supported by the output axis 26 rotatably. In addition, the third clutch 25 is a clutch mechanism, which is attached to the output axis 26 for connecting and disconnecting the output axis 26 and the driven gear 20 with each other. The third clutch 25 may be a wet-type clutch or dry-type clutch.

The motor-side driven gear 22 is engaged with the drive gear 21, and supported by the output axis 26 rotatably. In addition, the second clutch 24 is a clutch mechanism, which is attached to the output axis 26 for connecting and disconnecting the output axis 26 and the driven gear 22 with each other. The second clutch 24 may be a wet-type clutch or dry-type clutch.

In addition, the power of the output axis 26 is transmitted to the driving wheel 29 via a final gear (unshown), the differential gear 27, and the axle 28. Connecting (fastening) the third clutch 25 permits power transmission between the output axis 26 and the engine-side driven gear 20. Therefore, power transmission is achieved between the second engine input axis 17 and the output axis 26 via the engine-side drive gear 19, the driven gear 20, and the third clutch 25 without the motor input axis 18 intervening. On the contrary, disconnecting (opening) the third clutch 25 disables or stops power transmission between the second engine input axis 17 and the output axis 26 via the engine-side drive gear 19 and the driven gear 20. The engine-side drive gear 19 and the driven gear 20 forms an engine-side gear mechanism 32.

Further, connecting the second clutch 24 permits power transmission between the output axis 26 and the motor-side driven gear 22. Therefore, power transmission is achieved between the motor input axis 18 and the output axis 26 via the motor-side drive gear 21, the driven gear 22, and the second clutch 24 without the engine input axes 15, 17 intervening. On the contrary, disconnecting (opening) the second clutch 24 disables or stops power transmission between the motor input axis 18 and the output axis 26 via the motor-side drive gear 21 and the driven gear 22. The motor-side drive gear 21 and the driven gear 22 forms an motor-side gear mechanism 33.

Connecting the first clutch 23 permits power transmission between the second engine input axis 17 and the motor input axis 18 via the first clutch 23. Disconnecting the first clutch 23 disables power transmission between the second engine input axis 17 and the motor input axis 18 via the first clutch 23.

In addition, when the first clutch 23 is connected, power transmission is always enabled between (i) a position at which the second engine input axis 17 is attached with the drive gear 19 and (ii) a position at which the motor input axis 18 is attached with the drive gear 21. In other words, only the first clutch 23 exists in the power transmission path between (i) the position at which the engine-side drive gear 19 is attached and (ii) the position at which the motor-side drive gear 21 is attached, over the input axes 15, 17, 18. This configuration reduces the number of clutches compared with a conventional one, thereby reducing the size of the power transmission apparatus 11.

In addition, the first clutch 23 and the engine-side drive gear 19 are disposed between the motor-side drive gear 21 and the engine 12; this reduces the distance from the engine 12 to the drive gear 19, thereby maintaining high resistance against a torsional vibration of the engine input axes 15, 17.

In addition, the first clutch 23 and the motor-side drive gear 21 are disposed between the engine-side drive gear 19 and the motor generator 13; this reduces the distance from the motor generator 13 to the motor-side drive gear 21, thereby maintaining high resistance against a torsional vibration of the motor input axis 18.

A hybrid ECU 34 is a computer which controls the whole of the vehicle comprehensively, reads output signals of the various sensors or switches and a remaining amount of the battery 31, and detects a travel state of the vehicle. The sensors or switches include an accelerator sensor 35 which detects an accelerator opening (control input of an accelerator pedal); a shift switch 36 which detects a shift position (operative position of a shift lever); a brake switch 37 which detects a brake operation; and a vehicle speed sensor 38 which detects a speed of the vehicle. The remaining amount of the battery 31 is detected or calculated by the battery ECU 39 which monitors the voltage and electric current of the battery 31. The battery ECU 39 detects or calculates SOC (State Of Charge) indicating the charge status of the battery 31 as information on the remaining amount of the battery 31, for example.

The hybrid ECU 34 exchanges control signals with (i) the engine ECU 40 which controls driving of the engine 12, (ii) the motor ECU 41 which controls the inverter 30 and controls the motor generator 13, and (iii) a clutch ECU 42 which controls the first to third clutch control mechanisms 43 to 45 (for example, actuator which generates an oil pressure for connection and disconnection of a clutch) and controls the first to third clutches 23 to 25. The clutch ECU 42 may be also referred to a gear change ECU 42. The hybrid ECU 34 controls the engine 12 the motor generator 13, and the first to third clutches 23 to 25 in cooperation with the ECUs 40 to 42 depending on the driving state of the vehicle.

This configuration permits the power generated by the motor generator 13 to transfer to the driving wheel 29 via the motor-side gear mechanism 33 and via the engine-side gear mechanism 32. Similarly, it permits the power generated by the engine 12 to transfer to the driving wheel 29 via the motor-side gear mechanism 33 and via the engine-side gear mechanism 32.

Further, the present embodiment provides a configuration by the hybrid ECU 34 or clutch ECU 42 executing a clutch control routine in FIG. 6 and FIG. 7 later mentioned. That is, the hybrid ECU 34 or clutch ECU 42 may function as a control apparatus of the vehicle driving system including the power transmission apparatus 11. Now, a slip travel mode is defined as being traveling or starting in a state where the first clutch 23 is fully connected (fully fastened, in a fully fastened state) while either the second clutch 24 or the third clutch 25 is slipped (in a slipped state). Suppose a case where it is determined that the second clutch 24 or the third clutch 25 is in a high-temperature state under the slip travel mode; the high-temperature state is a state at a temperature higher than a high-temperature-side threshold value. In such a case, it is determined that if the high-temperature state further continues to take place, the second clutch 24 or the third clutch 25 may become in an overheated state (a state at a higher temperature than a permissible upper limit temperature); thereby, the slip travel mode is switched into an overheat avoidance mode where a travel or start-up is made in a state where the first clutch 23 is in a fully disconnected state (fully open state) while the second clutch 24 is in a fully connected state. This reduces a heat value of the second clutch 24 or the third clutch 25, avoiding beforehand the second clutch 24 or third clutch 25 from becoming in an overheated state.

Figure 2:
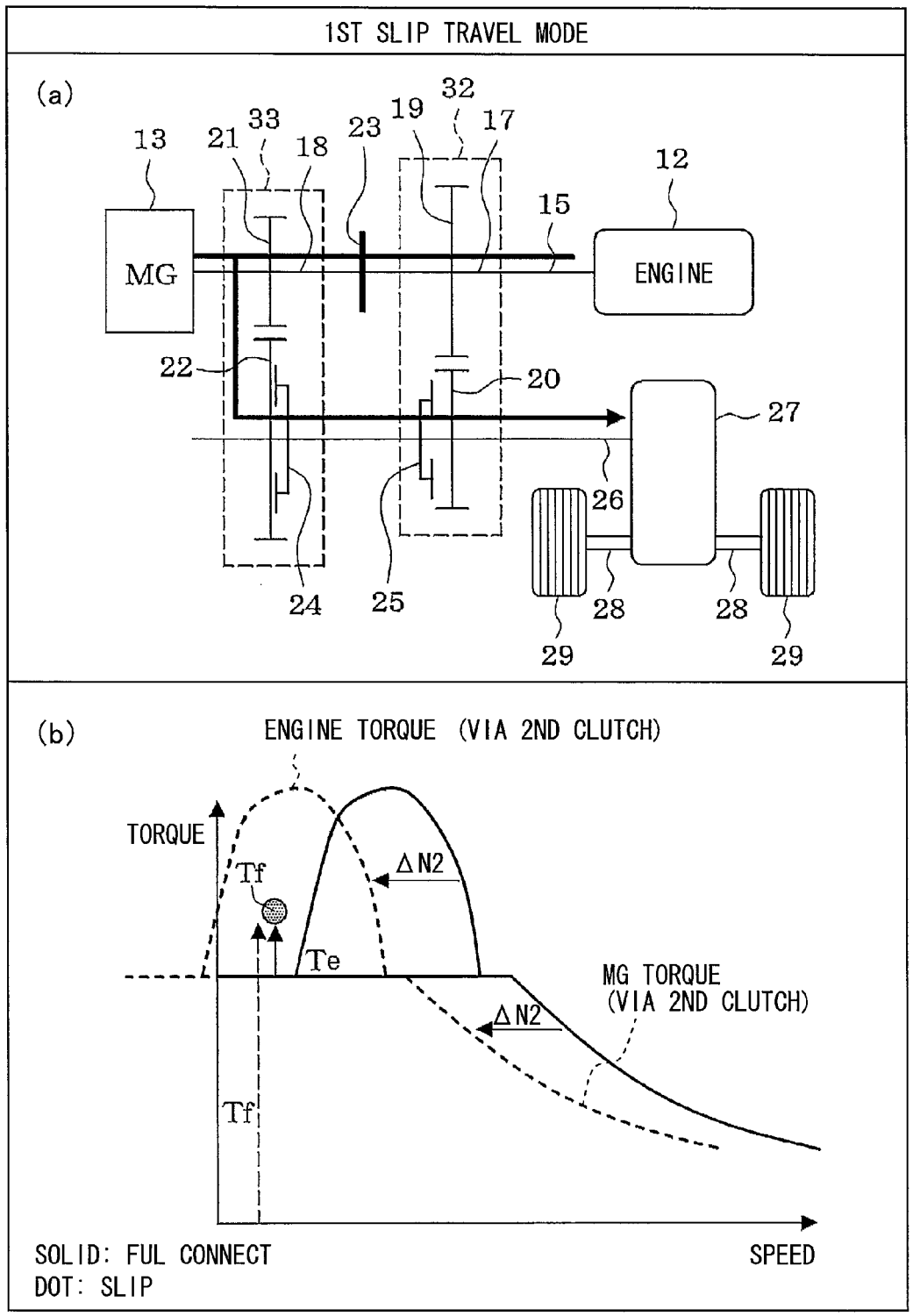
FIG. 2 is a diagram for explaining a first slip travel mode.

For instance, as shown in FIG. 2, the first slip travel mode permits a travel or start-up in a state where (i) the first clutch 23 is fully connected, (ii) the third clutch 25 is fully disconnected, and (iii) the second clutch 24 is in a slipped state. This mode or case provides both of the power of the engine 12 and the power of the motor generator 13 to be transmitted to the output axis 26 via the motor-side gear mechanism 33 and the second clutch 24. To achieve the requested driving torque Tf of the output axis 26 calculated based on the accelerator opening, the first slip travel mode controls the torque of the engine 12 and the torque of the motor generator 13 and the slip amount of the second clutch 24.

A load L2 applied to the second clutch 24 under the first slip travel mode is expressed by Expression 1 using a requested driving torque Tf and a slip amount $\Delta N2$ of the second clutch 24 (rotational speed difference between the input side and the output side of the second clutch 24).

$$L2 = Tf \times \Delta N2 \quad \text{[Expression 1]}$$

When it is determined that the second clutch 24 is in a high-temperature state under the first slip travel mode, the hybrid ECU 34 determines that the second clutch 24 may become in an overheated state. The hybrid ECU 34 then decreases the slip amount of the second clutch 24 and increases the slip amount of the first clutch 23 and the slip amount of the third clutch 25, thereby switching the first slip travel mode into the overheat avoidance mode. The overheat avoidance mode permits a travel or start-up in a state where (i) the first clutch 23 is fully disconnected, (ii) the second clutch 24 is fully connected, and (iii) the third clutch 25 is in a slipped state. In this mode or case, the power of the engine 12 is transmitted to the output axis 26 via the engine-side gear mechanism 32 and the third clutch 25 while the power of the motor generator 13 is transmitted to the output axis 26 via the motor-side gear mechanism 33 and via the second clutch 24. The overheat avoidance mode thus controls the torque of the engine 12, the torque of the motor generator 13, and the slip amount of the third clutch 25 to achieve a requested driving torque.

Thus, the first slip travel mode is switched into the overheat avoidance mode, thereby switching the second clutch 24 from the slipped state into the fully connected state. The slip amount $\Delta N2$ of the second clutch 24 reduces to zero (0); this reduces the heat value of the second clutch 24.

A load L3 applied to the third clutch 25 under the overheat avoidance mode is expressed by Expression 2 using (i) an engine torque Te within a requested driving torque Tf and (ii) a slip amount $\Delta N3$ of the third clutch 25 (rotational speed difference between the input side and the output side of the third clutch 25).

$$L3 = Te \times \Delta N3 \quad \text{[Expression 2]}$$

Figure 3:
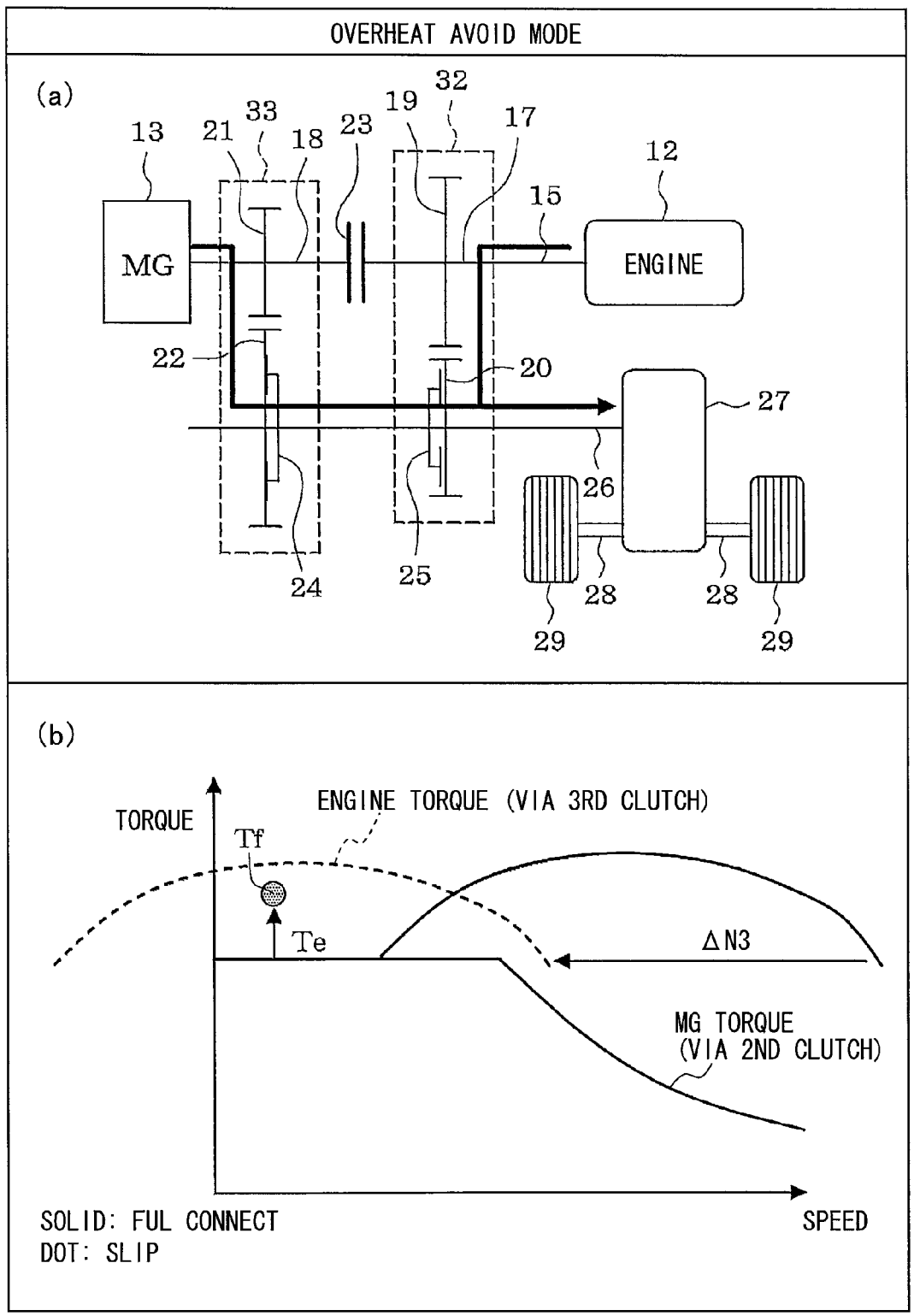
FIG. 3 is a diagram for explaining an overheat avoidance mode (part 1)

The load L3 applied to the third clutch 25 under the overheat avoidance mode is decreased against the load L2 applied to the second clutch 24 uder the first slip travel mode; the heat value of the third clutch 25 under the overheat avoidance mode can be decreased against the heat value of the second clutch 24 under the first slip travel mode. It is noted that FIG. 2 (b) and FIG. 3 (b) indicate examples when the gear ratio (reduction ratio) of the motor-side gear mechanism 33 is greater than the gear ratio (reduction ratio) of the engine-side gear mechanism 32.

Figure 4:
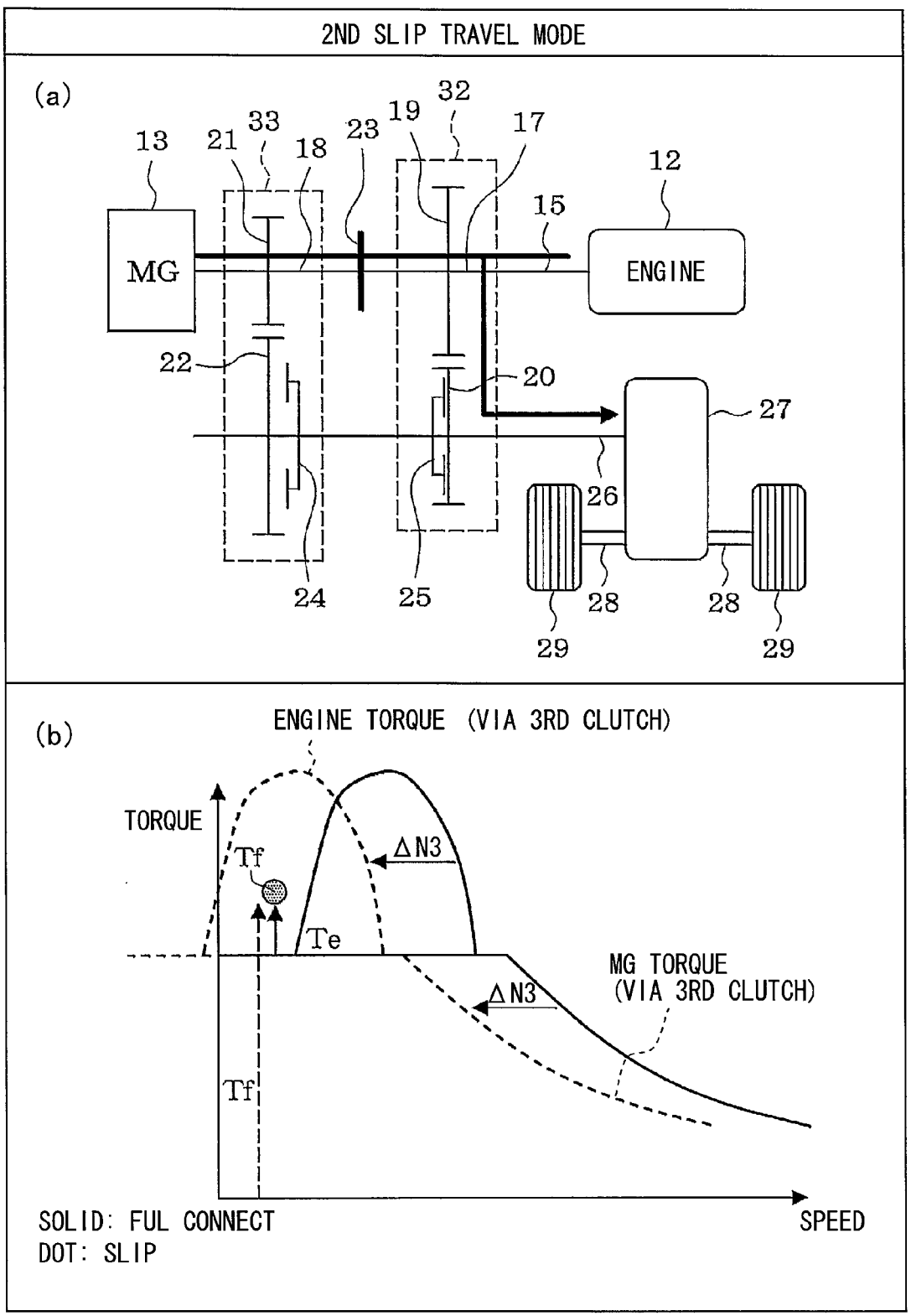
FIG. 4 is a diagram for explaining a second slip travel mode.

In contrast, with reference to FIG. 4, the second slip travel mode permits a travel or start-up in a state where (i) the first clutch 23 is fully connected, (ii) the second clutch 24 is fully disconnected, and (iii) the third clutch 25 is in a slipped state. This mode or case provides both of the power of the engine 12 and the power of the motor generator 13 to be transmitted to the output axis 26 via the engine-side gear mechanism 32 and the third clutch 25. The overheat avoidance mode thus controls the torque of the engine 12, the torque of the motor generator 13, and the slip amount of the third clutch 25 to achieve a requested driving torque.

A load L3 applied to the third clutch 25 under the second slip travel mode is expressed by Expression 3 using a requested driving torque Tf and a slip amount ΔN3 of the third clutch 25.

$$L3 = Tf \times \Delta N3 \quad \text{[Expression 3]}$$

Figure 5:
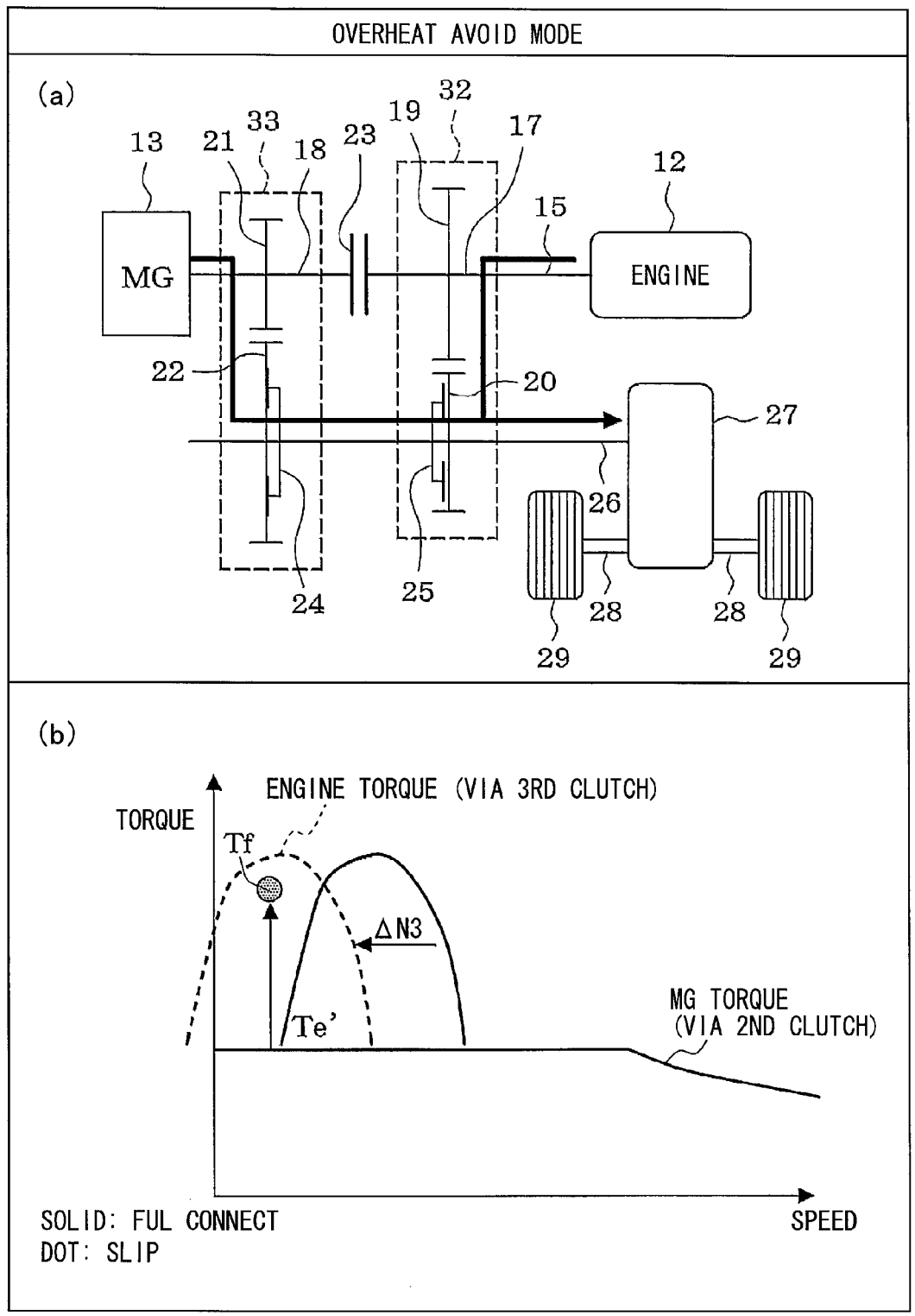
FIG. 5 is a diagram for explaining an overheat avoidance mode (part 2)

When it is determined that the third clutch 25 is in a high-temperature state under the second slip travel mode, the hybrid ECU 34 determines that the third clutch 25 may become in the overheated state. The hybrid ECU 34 increases the slip amount of the first clutch 23 and the slip amount of the second clutch 24, thereby switching the second slip travel mode into the overheat avoidance mode (the same mode as the overheat avoidance mode explained in FIG. 3), as indicated in FIG. 5.

A load L3' applied to the third clutch 25 under the overheat avoidance mode is expressed by Expression 4 using (i) an engine torque Te' within a requested driving torque Tf and (ii) a slip amount XN3 of the third clutch 25.

$$L3' = Te' \times \Delta N3 \quad \text{[Expression 4]}$$

The load L3' applied to the third clutch 25 under the overheat avoidance mode can be decreased against the load L3 applied to the third clutch 25 under the second slip travel mode. Thus, the heat value of the third clutch 25 in the overheat avoidance mode can be decreased against the heat value of the third clutch 25 under the second slip travel mode. It is noted that FIG. 4 (b) and FIG. 5 (b) indicate examples when the gear ratio (reduction ratio) of the motor-side gear mechanism 33 is smaller than the gear ratio (reduction ratio) of the engine-side gear mechanism 32.

Furthermore, suppose a case where it is determined that the second clutch 24 or the third clutch 25 is under a non-high-temperature state under the overheat avoidance mode; the non-high-temperature state is a state at a temperature lower than a low-temperature-side threshold value. In such a case, after the hybrid ECU 34 increases the slip amount of the first clutch 23 and the slip amount of the second clutch 24, the first clutch 23 is fully connected while the second clutch 24 or the third clutch 25, whichever is not determined to be in the non-high-temperature state, is switched into a fully disconnected state.

Specifically, when it is determined that the second clutch 24 is in the non-high-temperature state under the overheat avoidance mode, the hybrid ECU 34 increases the slip amount of the first clutch 23 and the slip amount of the second clutch 24, and then switches the first clutch 23 into the fully connected state while switching the third clutch 25 into the fully disconnected state. Thereby, the overheat avoidance mode is switched into the first slip travel mode that permits a travel or start-up in a state where the second clutch 24 (that is determined to be in the non-high-temperature state) is in a slipped state.

In contrast, when it is determined that the third clutch 25 is in the non-high-temperature state under the overheat avoidance mode, the hybrid ECU 34 increases the slip amount of the first clutch 23 and the slip amount of the second clutch 24, and then switches the first clutch 23 into the fully connected state while switching the second clutch 24 into the fully disconnected state. Thereby, the overheat avoidance mode is switched again into the second slip travel mode that permits a travel or start-up in a state where the third clutch 25 (that is determined to be in the non-high-temperature state) is in a slipped state.

Figure 6:
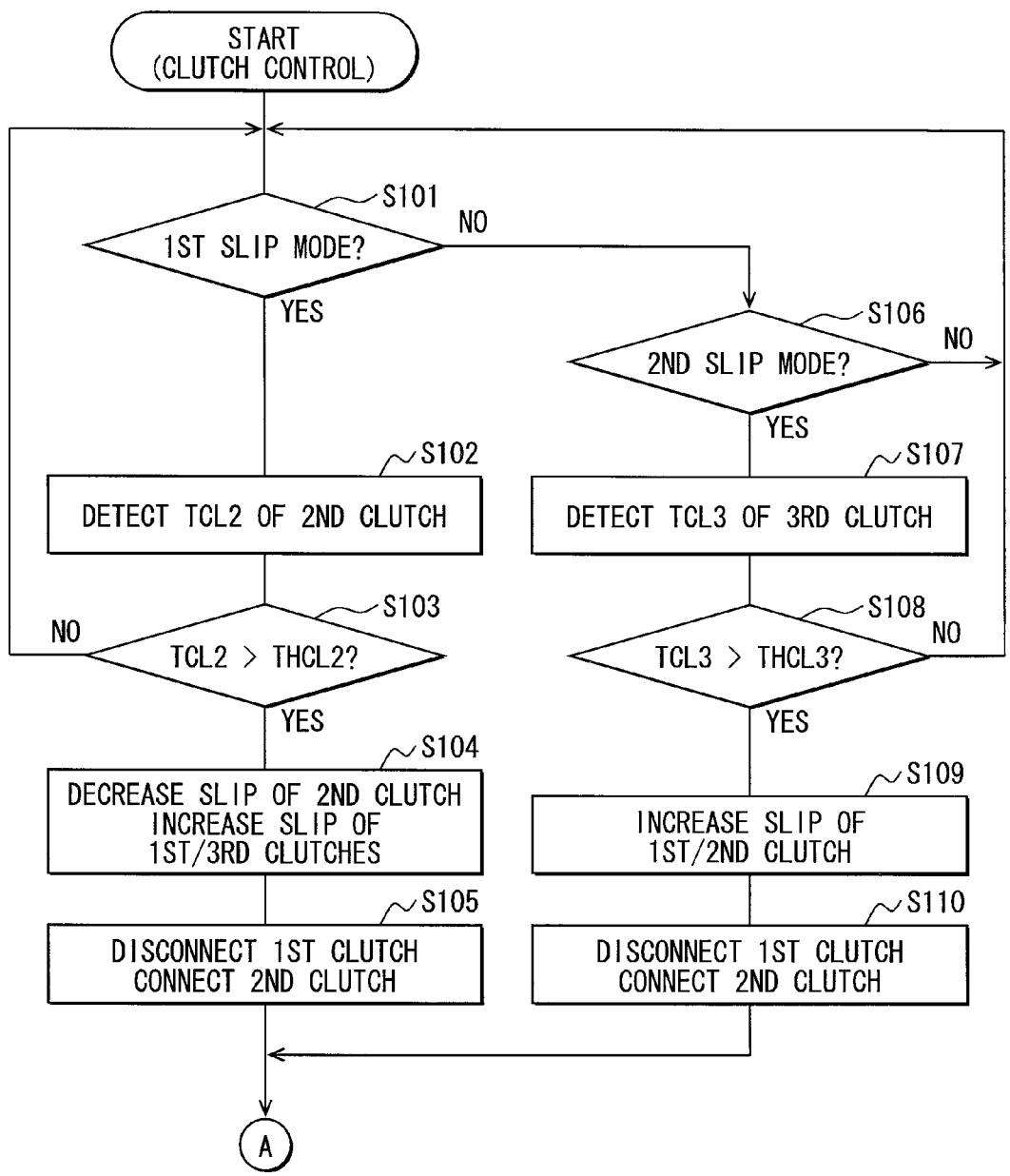
FIG. 6 is a flowchart diagram illustrating a clutch control routine (part 1)
Figure 7:
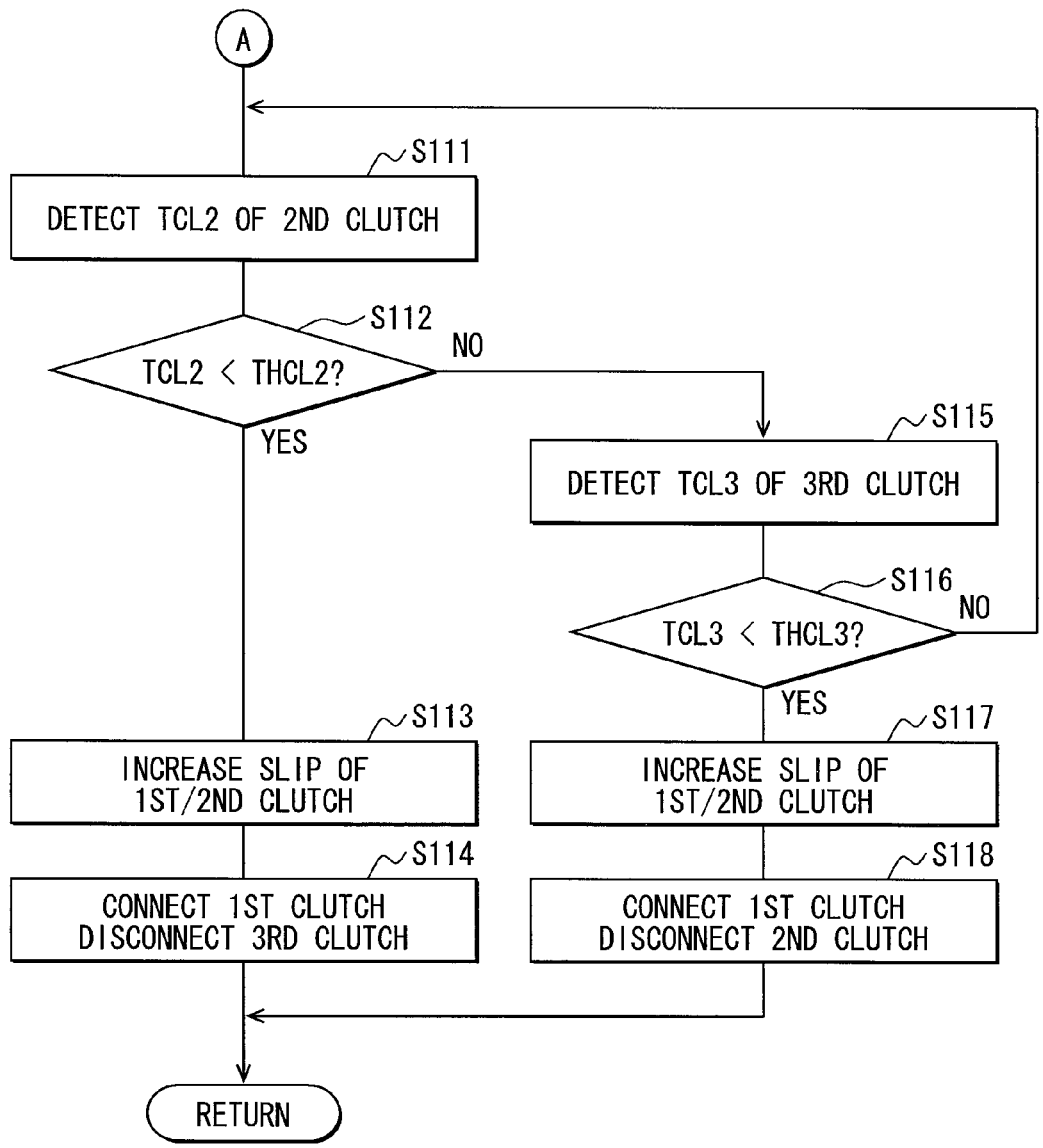
FIG. 7 is a flowchart diagram illustrating a clutch control routine (part 2)

With reference to FIGS. 6, 7, the following will explain a clutch control routine executed by the hybrid ECU 34 (or clutch ECU 42).

It is further noted that a flowchart in the present application includes sections (also referred to as steps), which are represented, for instance, as S101. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section, including or not including a function of a related apparatus. Further, the hardware section may be inside of a microcomputer.

The clutch control routine is periodically executed while the hybrid ECU 34 is in a power-on state to function as a clutch control section, device, or means. The present routine is started. At S101, it is determined whether the first slip travel mode takes place which permits a travel or start-up in a state where (i) the first clutch 23 is fully connected, (ii) the third clutch 25 is fully disconnected, and (iii) the second clutch 24 is in a slipped state.

When it is determined that the first slip travel mode takes place, the flow moves to S102, where a temperature TCL2 of the second clutch 24 is detected or estimated. In this case, for example, the temperature TCL2 of the second clutch 24 may be replaced by a temperature of an operating oil of the second clutch 24 detected by a temperature sensor. Further, the temperature TCL2 of the second clutch 24 may be estimated or calculated based on the slip amount and control instruction value of the second clutch 24 (for example, a stroke instruction value or an oil pressure instruction value).

The flow then proceeds to S103, where whether the second clutch 24 is in the high-temperature state is determined by determining whether the temperature TCL2 of the second clutch 24 is greater than a high-temperature-side threshold value THCL2. This high-temperature-side threshold value THCL2 is a temperature (for example, 150 to 180 degrees centigrade) lower than a permissible temperature upper limit of the second clutch 24, and is designated based on the remaining amount (i.e., SOC) of the battery 31 with reference to the map of the high-temperature-side threshold value THCL2 in FIG. 8.

In the overheat avoidance mode, the first clutch 23 is fully disconnected, disabling converting the power of the engine 12 by the motor generator 13 into the electric power so as to charge the battery 31. Such a situation is taken into consideration so that the map designates the high-temperature-side threshold value THCL2 being lower as the remaining amount of the battery 31 is higher. Thereby, the high-temperature-side threshold value THCL2 is lower as the remaining amount of the battery 31 is higher. This facilitates switching into the overheat avoidance mode. In other words, the high-temperature-side threshold value THCL2 is higher as the remaining amount of the battery 31 is lower. This makes it more difficult to switch into the overheat avoidance mode.

When it is determined that the second clutch 24 is not in the high-temperature state (temperature TCL2 of the second clutch 24 is equal to or less than the high-temperature-side threshold value THCL2), the flow returns to above S101.

In contrast, when it is determined that the second clutch 24 is in the high-temperature state (temperature TCL2 of the second clutch 24 is greater than the high-temperature-side threshold value THCL2), it is determined that the second clutch 24 may become in the overheated state. The flow then proceeds to S104, where the slip amount of the second clutch 24 is decreased and the slip amount of the first clutch 23 and the slip amount of the third clutch 25 are increased. The flow then proceeds to S105, where the first clutch 23 is fully disconnected and the second clutch 24 is fully connected. Thereby, the first slip travel mode is switched into the overheat avoidance mode which permits a travel or start-up in a state where (i) the first clutch 23 is fully disconnected, (ii) the second clutch 24 is fully connected, and (iii) the third clutch 25 is in a slipped state.

In contrast, when it is determined at S101 that the first slip travel mode does not take place, the flow proceeds to S106. At S106, it is determined whether the second slip travel mode takes place which permits a travel or start-up in a state where (i) the first clutch 23 is fully connected, (ii) the second clutch 24 is fully disconnected, and (iii) the third clutch 25 is in a slipped state. When it is determined that the second slip travel mode does not take place, the flow returns to S101.

In contrast, when it is determined at S106 that the second slip travel mode takes place, the flow proceeds to S107. At S107, the temperature TCL3 of the third clutch 25 is detected or estimated. In this case, for example, the temperature TCL3 of the third clutch 25 may be replaced by a temperature of an operating oil of the third clutch 25 detected by a temperature sensor. Further, the temperature TCL3 of the third clutch 25 may be estimated or calculated based on the slip amount and control instruction value of the third clutch 25 (for example, a stroke instruction value, an oil pressure instruction value).

The flow then proceeds to S108, where whether the third clutch 25 is in the high-temperature state is determined by determining whether the temperature TCL3 of the third clutch 25 is greater than a high-temperature-side threshold value THCL3. This high-temperature-side threshold value THCL3 is a temperature (for example, 150 to 180 degrees centigrade) lower than a permissible temperature upper limit of the third clutch 25, and is designated based on the remaining amount (i.e., SOC) of the battery 31 with reference to the map of the high-temperature-side threshold value THCL3 in FIG. 8. The map designates the high-temperature-side threshold value THCL3 being lower as the remaining amount of the battery 31 is higher. In other words, the high-temperature-side threshold value THCL3 is lower as the remaining amount of the battery 31 is higher. This makes it easier to switch into the overheat avoidance mode. In other words, the high-temperature-side threshold value THCL3 is higher as the remaining amount of the battery 31 is lower. This makes it more difficult to switch into the overheat avoidance mode.

When it is determined at S108 that the third clutch 25 is not in the high-temperature state (temperature TCL3 of the third clutch 25 is equal to or less than the high-temperature-side threshold value THCL3), the flow returns to above S101.

In contrast, when it is determined at S108 that the third clutch 25 is in the high-temperature state (temperature TCL3 of the third clutch 25 is greater than the high-temperature-side threshold value THCL3), the hybrid ECU 34 determines that the third clutch 25 may become in the overheated state. The flow then proceeds to S109, where the slip amount of the first clutch 23 and the slip amount of the second clutch 24 are increased. The flow then proceeds to S110, where the first clutch 23 is fully disconnected and the second clutch 24 is fully connected. Thereby, the second slip travel mode is switched into the overheat avoidance mode which permits a travel or start-up in a state where (i) the first clutch 23 is fully disconnected, (ii) the second clutch 24 is fully connected, and (iii) the third clutch 25 is in a slipped state.

After switching into the overheat avoidance mode at S105 or S110, the flow proceeds to S111, where the temperature TCL2 of the second clutch 24 is detected or estimated. Subsequently, at S112, whether the second clutch 24 is in the non-high-temperature state is determined by determining whether the temperature TCL2 of the second clutch 24 is less than a low-temperature-side threshold value TLCL2. This low-temperature-side threshold value TLCL2 is a temperature (for example, 120 to 140 degrees centigrade) lower than the high-temperature-side threshold value THCL2 of the second clutch 24, and is designated based on the remaining amount (i.e., SOC) of the battery 31 with reference to the map of the low-temperature-side threshold value TLCL2 in FIG. 8. The map designates the low-temperature-side threshold value TLCL3 being higher as the remaining amount of the battery 31 is higher. As explained above, the high-temperature-side threshold value THCL2 is lower as the remaining amount of the battery 31 is higher. This makes it easier to switch to the overheat avoidance mode. In contrast, the low-temperature-side threshold value TLCL2 is higher as the remaining amount of the battery 31 is higher. This makes it easier to return to the first or second slip travel mode. The decline of the remaining amount of the battery 31 is thereby suppressed.

When it is determined at S112 that the second clutch 24 is in the non-high-temperature state (temperature TCL2 of the second clutch 24 is less than the low-temperature-side threshold value TLCL2), the flow proceeds to S113. At S113, the slip amount of the first clutch 23 and the slip amount of the second clutch 24 are increased. The flow then proceeds to S114, where the first clutch 23 is fully connected and the third clutch 25 is fully disconnected. Thereby, the overheat avoidance mode is switched into the first slip travel mode that permits a travel or start-up in a state where the second clutch 24 (that is determined to be in the non-high-temperature state) is in a slipped state.

In contrast, when it is determined at S112 that the second clutch 24 is not in the non-high-temperature state (temperature TCL2 of the second clutch 24 is equal to or greater than the low-temperature-side threshold value TLCL2, the flow proceeds to S115, where the temperature TCL3 of the third clutch 25 is detected or estimated.

Subsequently, at S116, whether the third clutch 25 is in the non-high-temperature state is determined by determining whether the temperature TCL3 of the third clutch 25 is less than a low-temperature-side threshold value TLCL3. This low-temperature-side threshold value TLCL3 is a temperature (for example, 120 to 140 degrees centigrade) lower than the high-temperature-side threshold value THCL3 of the third clutch 25, and is designated based on the remaining amount (i.e., SOC) of the battery 31 with reference to the map of the low-temperature-side threshold value TLCL3 in FIG. 8. The map designates the low-temperature-side threshold value TLCL3 being higher as the remaining amount of the battery 31 is higher. As explained above, the high-temperature-side threshold value THCL3 is lower as the remaining amount of the battery 31 is higher. This makes it easier to switch to the overheat avoidance mode. In contrast, the low-temperature-side threshold value TLCL3 is higher as the remaining amount of the battery 31 is higher. This makes it easier to return to the first or second slip travel mode. The decline of the remaining amount of the battery 31 is thereby suppressed.

When it is determined at S116 that the third clutch 25 is not in the non-high-temperature state (temperature TCL3 of the third clutch 25 is equal to or greater than the low-temperature-side threshold value TLCL3, the flow returns to above S111.

In contrast, when it is determined at S116 that the third clutch 25 is in the non-high-temperature state (temperature TCL3 of the third clutch 25 is less than the low-temperature-side threshold value TLCL3), the flow proceeds to S117. At S117, the slip amount of the first clutch 23 and the slip amount of the second clutch 24 are increased. The flow then proceeds to S118, where the first clutch 23 is fully connected and the second clutch 24 is fully disconnected. Thereby, the overheat avoidance mode is switched again into the second slip travel mode that permits a travel or start-up in a state where the third clutch 25 (that is determined to be in the non-high-temperature state) is in a slipped state.

Figure 8:
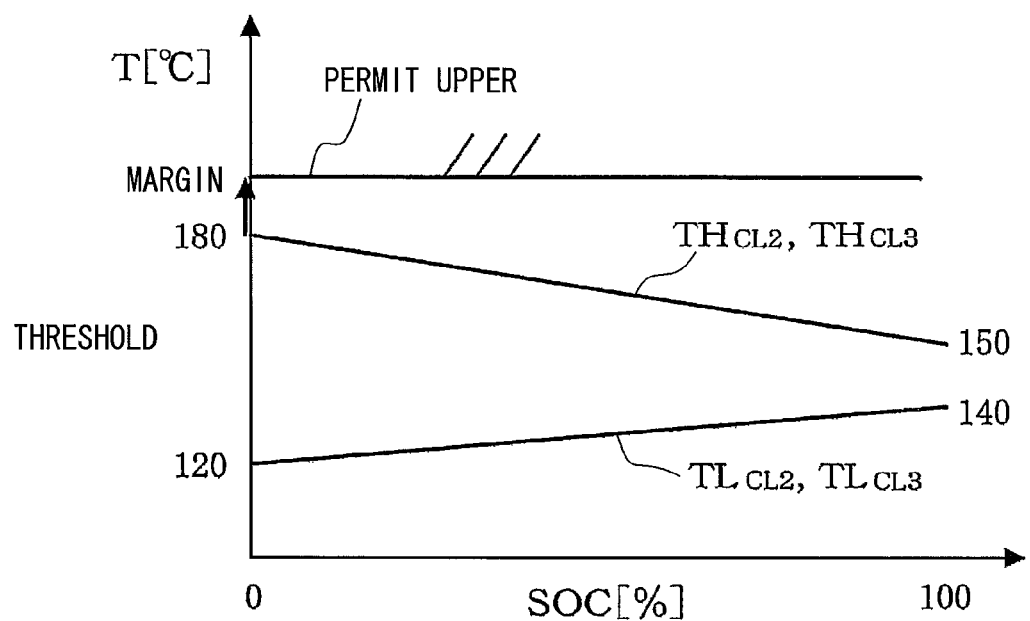
FIG. 8 is a diagram schematically illustrating an example of a map of a high-temperature-side threshold value and a low-temperature-side threshold value.

The map of the high-temperature-side threshold values THCL2, THCL3 and the map of the low-temperature-side threshold values TLCL2, TLCL3 in FIG. 8 are previously prepared based on test data or design data, and stored in the ROM of the hybrid ECU 34 (or clutch ECU 42).

In addition, S103 and S107 by the hybrid ECU 34 may function as a high-temperature determination section, device, or means. In addition, S112 and S116 by the hybrid ECU 34 may function as a non-high-temperature determination section, device, or means.

As mentioned above, the present embodiment provides the following configuration. The first slip travel mode is defined as a mode which permits a travel or start-up in a state where (i) the first clutch 23 is fully connected, (ii) the third clutch 25 is fully disconnected, and (iii) the second clutch 24 is in a slipped state. Suppose a case where it is determined that the second clutch 24 or the third clutch 25 is in the high-temperature state under the first slip travel mode. In such a case, the hybrid ECU 34 determines that the second clutch 24 may become in the overheated state. Thereby, the first slip travel state is switched into the overheat avoidance mode which permits a travel or start-up in a state where (i) the first clutch 23 is fully disconnected, (ii) the second clutch 24 is fully connected, and (iii) the third clutch 25 is in a slipped state. This reduces a heat value of the second clutch 24, avoiding beforehand the second clutch 24 from becoming in an overheated state.

In contrast, the second slip travel mode is defined as a mode which permits a travel or start-up in a state where (i) the first clutch 23 is fully connected, (ii) the second clutch 24 is fully disconnected, and (iii) the third clutch 25 is in a slipped state. Suppose a case where it is determined that the third clutch 25 is in the high-temperature state under the second slip travel mode. In such a case, the hybrid ECU 34 determines that the third clutch 25 may become in the overheated state, switching the second slip travel mode into the overheat avoidance mode. This reduces a heat value of the third clutch 25, avoiding beforehand the third clutch 25 from becoming in an overheated state.

Further, in the overheat avoidance mode, the first clutch 23 is fully disconnected. This permits the power of the engine 12 and the power of the motor generator 13 to independently transfer to the output axis 26. Thus, the second clutch 24 is fully connected without limitation due to the lower limit rotation speed (idling speed) of the engine 12 while the requested driving force is realizable with the power of the engine 12 and the power of the motor generator 13. In addition, although the second clutch 24 is fully connected, the first clutch 23 is fully disconnected. This eliminates a possibility that the engine 12 and the motor generator 13 are locked, making the clutch control easier and avoiding the degrading of driveability.

Further, in the present embodiment, when it is determined that the second clutch 24 is in the high-temperature state under the first slip travel mode, the first slip travel mode is switched into the overheat avoidance mode after decreasing the slip amount of the second clutch 24 and increasing the slip amount of the first clutch 23 and the slip amount of the third clutch 25. This permits the first slip travel mode to transfer to the overheat avoidance mode smoothly without worsening driveability.

Furthermore, in the present embodiment, when it is determined that the third clutch 25 is in the high-temperature state under the second slip travel mode, the second slip travel mode is switched into the overheat avoidance mode after increasing the slip amount of the first clutch 23 and the slip amount of the second clutch 24. This permits the second slip travel mode to transfer to the overheat avoidance mode smoothly without worsening driveability.

Further, in the present embodiment, when it is determined that the second clutch 24 is in the non-high-temperature state under the overheat avoidance mode, the hybrid ECU 34 increases the slip amount of the first clutch 23 and the slip amount of the second clutch 24, and then switches the first clutch 23 into the fully connected state while switching the third clutch 25 into the fully disconnected state. Thereby, the overheat avoidance mode is switched into the first slip travel mode that permits a travel or start-up in a state where the second clutch 24 (that is determined to be in the non-high-temperature state) is in a slipped state.

In contrast, when it is determined that the third clutch 25 is in the non-high-temperature state under the overheat avoidance mode, the hybrid ECU 34 increases the slip amount of the first clutch 23 and the slip amount of the second clutch 24, and then switches the first clutch 23 into the fully connected state while switching the second clutch 24 into the fully disconnected state. Thereby, the overheat avoidance mode is switched into the second slip travel mode that permits a travel or start-up in a state where the third clutch 25 (that is determined to be in the non-high-temperature state) is in a slipped state.

In the above embodiment, the high-temperature-side threshold values THCL2, THCL3 and the low-temperature-side threshold values TLCL2, TLCL3 are changed according to the remaining amount (e.g., SOC) of the battery 31. Without need to be limited to the above, the high-temperature-side threshold values THCL2, THCL3 and the low-temperature-side threshold values TLCL2, TLCL3 may be fixed values that are predetermined.

Further, in the above embodiment, the present disclosure is applied to the system using oil-pressure drive clutches as the first to third clutches. Without need to be limited thereto, the present disclosure may be applied to a system using electromagnetism drive clutches as the first to third clutches, or a system using an oil-pressure drive clutch and an electromagnetism clutch as the first to third clutches.

In addition, the present disclosure is applied to a system using a single motor generator as the power source of the vehicle. Without need to be limited thereto, the present disclosure may be applied to a system using more than one motor generator as the power source of the vehicle, e.g., a system using a first motor generator linked with an motor input axis and a second motor generator linked with an output axis.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A control apparatus for a vehicle driving system in a vehicle, the system including a power transmission apparatus to transmit power of an engine and power of a motor generator to an axle, the power transmission apparatus including:
an engine input axis which transmits the power of the engine;
a motor input axis which transmits the power of the motor generator;
an output axis which outputs a power transmitted to the axle;
an engine-side gear mechanism that transmits a power of the engine input axis to the output axis, without passing through the motor input axis;
a motor-side gear mechanism that transmits a power of the motor input axis to the output axis, without passing through the engine input axis;
a first clutch which connects and disconnects a power transmission between the engine input axis and the motor input axis;
a second clutch which connects and disconnects a power transmission between the motor-side gear mechanism and the output axis; and
a third clutch which connects and disconnects a power transmission between the engine-side gear mechanism and the output axis, the control apparatus comprising:
a high-temperature determination section that determines whether at least one of the second clutch and the third clutch is in a high-temperature state being a state at a temperature higher than a high-temperature-side threshold value; and
a clutch control section which switches a slip travel mode into an overheat avoidance mode when it is determined that the second clutch or the third clutch is in the high-temperature state under the slip travel mode, the slip travel mode being traveling or starting in a state where the first clutch is fully connected while either the second clutch or the third clutch is slipped, the overheat avoidance mode being traveling or starting in a state where the first clutch is fully disconnected while the second clutch is fully connected.

2. The control apparatus according to claim 1, wherein:
when it is determined that the second clutch is in the high-temperature state under the slip travel mode, the clutch control section decreases a slip amount of the second clutch while increasing a slip amount of the first clutch and a slip amount of the third clutch, and then switches the slip travel mode into the overheat avoidance mode.

3. The control apparatus according to claim 1, wherein:
when it is determined that the third clutch is in the high-temperature state under the slip travel mode, the clutch control section increases a slip amount of the first clutch and a slip amount of the second clutch, and then switches the slip travel mode into the overheat avoidance mode.

4. The control apparatus according to claim 1, further comprising:
a non-high-temperature determination section that determines whether at least one of the second clutch and the third clutch is in a non-high-temperature state being a state at a temperature lower than a low-temperature-side threshold value that is lower than the high-temperature-side threshold value, wherein:
when it is determined that one of the second clutch and the third clutch is in the non-high-temperature state under the overheat avoidance mode, the clutch control section increases a slip amount of the first clutch and a slip amount of the second clutch, and then switches the overheat avoidance mode into a state where the first clutch is fully connected and an other of the second clutch and the third clutch is fully disconnected, the other being not determined to be in the non-high-temperature state.

5. The control apparatus according to claim 1, wherein:
the high-temperature determination section decreases the high-temperature-side threshold value as a remaining amount of a battery increased, the battery exchanging an electric power with the motor generator.

6. The control apparatus according to claim 4, wherein:
the non-high-temperature determination section increases the low-temperature-side threshold value as a remaining amount of a battery increases, the battery exchanging an electric power with the motor generator.

* * * * *